(12) United States Patent
Maier et al.

(10) Patent No.: US 9,393,650 B2
(45) Date of Patent: Jul. 19, 2016

(54) METHOD FOR PRODUCING A SUPPORT STRUCTURE, PREFERABLY A SUPPORT STRUCTURE FOR VEHICLE SEAT

(75) Inventors: Jürgen Maier, Weitersweiler (DE); Andreas Cott, Waltershausen (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 755 days.

(21) Appl. No.: 12/759,562

(22) Filed: Apr. 13, 2010

(65) Prior Publication Data

US 2011/0030439 A1 Feb. 10, 2011

(30) Foreign Application Priority Data

Apr. 14, 2009 (DE) .......................... 10 2009 017 376

(51) Int. Cl.
*B23P 17/00* (2006.01)
*B21D 53/88* (2006.01)
(Continued)

(52) U.S. Cl.
CPC ................. *B23P 17/00* (2013.01); *B21C 23/06* (2013.01); *B21C 23/14* (2013.01); *B21D 22/02* (2013.01); *B21D 35/00* (2013.01); *B21D 53/88* (2013.01); *B60N 2/686* (2013.01)

(58) Field of Classification Search
CPC ...... B21C 23/06; B21C 23/142; B21C 23/14; B21C 23/21; B21C 23/217; B21C 23/08; B21C 53/88; B21C 22/02; B21C 35/00; B21C 35/001; B60N 2/686; B60N 2/68; B23P 17/00; B23P 11/00; B23P 2700/50; B21K 21/02; B21K 21/12; B21K 23/04; B21B 1/095; Y10T 29/49622

USPC ........ 72/254, 256, 262, 259, 257, 260, 253.1; 29/452.55

See application file for complete search history.

(56) References Cited

U.S. PATENT DOCUMENTS

| 1,423,361 | A | * | 7/1922 | Rockwell ........................ 72/254 |
| 4,155,593 | A | * | 5/1979 | Swenson ................ B60N 2/143 297/284.11 |
| 5,439,271 | A | * | 8/1995 | Ryan ........................ 297/452.56 |
| 5,720,511 | A |   | 2/1998 | Benedyk |
| 5,749,135 | A |   | 5/1998 | Crane et al. |

(Continued)

FOREIGN PATENT DOCUMENTS

| DE | 19847273 A1 | 10/1999 |
| DE | 10037327 A1 | 2/2002 |

(Continued)

OTHER PUBLICATIONS

British Patent Office, British Search Report for British Application No. GB 1004593.8, Jul. 16, 2010.

*Primary Examiner* — Shelley Self
*Assistant Examiner* — Mohammad I Yusuf
(74) *Attorney, Agent, or Firm* — Ingrassia Fisher & Lorenz PC

(57) ABSTRACT

A method is provided for producing a support structure, preferably a support structure for a vehicle seat having at least one seat shell for the seat part and/or the backrest of the vehicle seat, having the following method steps of producing a metal semi-finished product and reshaping it into an essentially flat plate, detaching a plate part from the plate, and deforming the plate part, the production of the metal semi-finished product being performed by extrusion. The semi-finished product may be already formed into a flat plate by the extrusion or the extrusion is performed with production of a curved plate, which is subsequently reshaped into a flat plate.

16 Claims, 3 Drawing Sheets

(51) Int. Cl.
*B21C 23/14* (2006.01)
*B21D 35/00* (2006.01)
*B21D 22/02* (2006.01)
*B21C 23/06* (2006.01)
*B60N 2/68* (2006.01)

(56) References Cited

U.S. PATENT DOCUMENTS

| | | | |
|---|---|---|---|
| 5,769,499 A | 6/1998 | Dudash et al. | |
| 5,829,298 A * | 11/1998 | Linsenbardt et al. | 72/256 |
| 5,988,757 A * | 11/1999 | Vishey et al. | 297/452.31 |
| 6,550,863 B2 | 4/2003 | Dill et al. | |
| 6,637,249 B1 * | 10/2003 | Heikkila | 72/262 |
| 7,096,557 B2 * | 8/2006 | Hanna et al. | 29/423 |
| 7,181,948 B2 * | 2/2007 | Arns | 72/185 |
| 2004/0107757 A1 | 6/2004 | Arns | |
| 2005/0077774 A1 * | 4/2005 | Schwarz | B60N 2/5685 297/452.18 |
| 2005/0283965 A1 | 12/2005 | Hanna et al. | |
| 2011/0048091 A1 * | 3/2011 | Kleber | B21C 23/142 72/60 |

FOREIGN PATENT DOCUMENTS

| | | |
|---|---|---|
| DE | 19727599 B4 | 8/2007 |
| DE | 102008048496 A1 | 4/2010 |
| GB | 2282551 A | 4/1995 |
| WO | 9714588 A1 | 4/1997 |
| WO | 9746413 A1 | 12/1997 |
| WO | 03059714 A1 | 7/2003 |

* cited by examiner

METHOD FOR PRODUCING A SUPPORT STRUCTURE, PREFERABLY A SUPPORT STRUCTURE FOR VEHICLE SEAT

CROSS-REFERENCE TO RELATED APPLICATION

This application claims priority to German Patent Application No. 102009017376.5, filed Apr. 14, 2009, which is incorporated herein by reference in its entirety.

TECHNICAL FIELD

The present invention relates to a method for producing a support structure, preferably a support structure for a vehicle seat having at least one seat shell for the seat part and/or the backrest of the vehicle seat.

BACKGROUND

Vehicle seats are known from the prior art which have a support structure, the support structure to allow a secure support of the vehicle occupant on the vehicle seat, i.e., the support structure causes the required stability of the vehicle seat or the seat part and/or the backrest of the vehicle seat. A support structure of this type is described, for example, in DE 100 37 327 A1. The known support structure for a vehicle seat comprises, inter alia, a seat shell which carries a seat cushion of the vehicle seat. The seat shell can comprise both plastic and also aluminum or steel plate.

To produce the seat shell comprising aluminum or steel plate, typically a metal semi-finished product is first produced, which can be formed from an aluminum or steel block, for example. The steel or aluminum block is subsequently rolled so that the metal semi-finished product is reshaped into an essentially flat plate. The semi-finished product is rolled until the flat plate reaches the target plate thickness. Subsequently, a plate part is detached from the plate, in that the plate part is stamped out of the plate, for example. The plate part is then deformed to implement the seat shell, the deformation typically being performed by deep-drawing of the plate part. The seat shell for the seat part and/or the backrest of the vehicle seat is thus finished and can be connected to the other components of the support structure for the vehicle seat.

The known method for producing the seat shell for the support structure of a vehicle seat has proven itself, but it is disadvantageous in that the production is very time-consuming, an increased energy supply also being required.

It is therefore at least one object of the present invention to disclose a method for producing a support structure, preferably a support structure for a vehicle seat having at least one seat shell for the seat part and/or the backrest of the vehicle seat, which allows rapid production and reduces the energy demand required for producing the support structure. In addition, other objects, desirable features, and characteristics will become apparent from the subsequent summary and detailed description, and the appended claims, taken in conjunction with the accompanying drawings and this background.

SUMMARY

The method according to an embodiment of the invention is used for producing a support structure, as can be used, for example, in a vehicle seat having at least one seat shell for the seat part and/or the backrest of the vehicle seat, in addition, a plurality of possible uses existing for the support structure, and has the method steps described hereafter. Firstly, a metal semi-finished product is produced, which is subsequently reshaped into an essentially flat plate. The listed method steps of production and reshaping do not necessarily have to be two separate method steps, rather the reshaping into a flat plate can already be performed by the production of the semi-finished product, as is the case in a preferred embodiment of the method according to the invention described in greater detail hereafter. Subsequently thereto, a plate part is detached from the essentially flat plate, in order to subsequently deform it, the deformation being able to be performed by deep-drawing, for example. The production of the metal semi-finished product is performed by extrusion.

In contrast to the prior art, in which the metal semi-finished product is first produced by casting and subsequently reshaped by rolling into an essentially flat plate, the production of the metal semi-finished product is performed by extrusion. In this way, it is possible to produce a metal semi-finished product which only still has to be rolled to a small extent or not at all, in order to obtain the flat plate, so that the production method can be performed in an energy-efficient and time-saving manner.

In order to avoid the time-consuming and energy-intensive rolling of the metal semi-finished product into an essentially flat plate entirely, the semi-finished product is already formed into a flat plate by the extrusion in a preferred embodiment of the method according to the invention. For this purpose, the die of the corresponding extrusion device can have a corresponding linear outlet opening, for example. In this way, complex rolling of the metal semi-finished product can be dispensed with, so that the method is accelerated, while the energy demand is also reduced.

In a further preferred embodiment of the method according to the invention, which represents an alternative embodiment to the embodiment described above, the extrusion is performed to produce a curved plate. The reshaping into a flat plate is only performed subsequently, the reshaping into a flat plate preferably being performed by roll forming of the curved plate. In order to produce a curved plate, the die of the corresponding extrusion device can have a U-shaped, N-shaped, Z-shaped, O-shaped, or W-shaped outlet opening, for example, so that a strand having a corresponding cross-section is produced. The curved plate thus primarily has the advantage that it can be produced more simply by the extrusion than is the case with a plate which is already flat. The subsequent reshaping of the curved plate thereof into a flat plate can also be implemented particularly easily, without the energy demand being substantially increased.

In a further preferred embodiment of the method according to the invention, it has proven to be advantageous if the curved plate is produced by extrusion in such a manner that it has an open cross-section, preferably a U-shaped cross-section. An open cross-section can also be understood to mean the W-shaped, Z-shaped, or N-shaped cross-sections previously cited, for example.

In a further preferred embodiment of the method according to the invention, the curved plate is produced by extrusion in such a manner that it has a closed cross-section, the closed cross-section being opened in a following work step in order to obtain a curved plate having open cross-section. A plate part having closed cross-section is understood here as a tubular plate part. The opening of the closed cross-section can be performed by cutting through the tubular plate part in the longitudinal direction.

According to a further preferred embodiment of the method according to the invention, the flat and/or curved plate is produced by extrusion so that its plate thickness is at most approximately 100%, preferably at most approximately 50% greater than the target plate thickness of the plate part to be deformed. In that the plate thickness is only slightly greater than the target plate thickness of the plate part to be deformed in this manner, only a small amount of rolling work must be performed in order to achieve the target plate thickness required for the plate part. The energy demand and the time consumption are thus reduced.

In a particularly preferred embodiment of the method according to the invention, the flat and/or curved plate is produced by extrusion in such a manner that its plate thickness corresponds to the target plate thickness of the plate part to be deformed. In that the plate thickness of the plate produced by extrusion already corresponds to the target plate thickness of the plate part to be deformed, no additional rolling work is to be performed in order to obtain the desired plate thickness of the plate part to be deformed, so that the energy demand and the time consumption are particularly low in this embodiment of the invention.

In an advantageous embodiment of the method according to the invention, the flat and/or curved plate, having a plate thickness which is greater, preferably at most approximately 100% greater, particularly preferably at most approximately 50% greater, than the target plate thickness of the plate part to be deformed, is rolled with reduction of the plate thickness down to the target plate thickness, as previously described. If the plate thickness in this embodiment already approximately corresponds to the target plate thickness of the plate part to be deformed, the corresponding rolling work and the time required for this purpose are significantly less.

In a further advantageous embodiment of the method according to the invention, the deformation of the plate part is performed by hot shaping, preferably by deep-drawing. In order to keep the energy expenditure in the scope of the hot shaping particularly low, the hot shaping is particularly preferably performed with exploitation of the heat from the extrusion. In this case, the plate part does not have to be warmed or heated again, because the heat of the plate part generated by the extrusion is typically sufficient for this purpose. Even if the heat from the extrusion method is not entirely sufficient, only a slight increase in heat is still necessary.

In a further advantageous embodiment of the method according to the invention, the semi-finished product is produced from a material having a lower density than steel. The material is preferably magnesium, aluminum, a magnesium alloy, or an aluminum alloy. In this context, materials whose density is at most approximately 25% of the density of steel have proven to be particularly preferred. Through the use of materials of this type, a significant weight reduction can be achieved at equal stability, even if the plate thickness of the plate part must be increased in order to obtain the same rigidity and strength as in a steel plate part. With a semi-finished product made of magnesium or a magnesium alloy, it has also been shown that these wrought alloys are not as brittle as cast alloys made of the same material.

In a further particularly preferred embodiment of the method according to the invention, the deformed plate part is fastened on an adjacent component of the support structure. The adjacent component can be a pivot apparatus of the support structure for a vehicle seat, for example. The fastening is preferably performed in this embodiment by plug welding, particularly because an especially reliable, rivet-like connection can be achieved in this way. The components particularly preferably comprise steel.

In a further advantageous embodiment of the method according to the invention, at least one hole is produced in the previously described adjacent component, the deformed plate part is situated on the component and heated in the area of the hole to a temperature which is between the melting temperature of the seat shell and the melting temperature of the component. If the plate part comprises magnesium or a magnesium alloy, for example, the heating causes the plate part to melt in the area of the hole, in order to subsequently flow through the hole inside the component. After the cooling, the previously described rivet-like connection between the plate part and the component results, so that a secure and permanent connection is achieved between the plate part and the component.

In a further particularly advantageous embodiment of the method according to the invention, at least one hole is produced in the adjacent component, the deformed plate part is situated on the component, and the deformed plate part is heated in the area of the hole to a temperature which is between the melting temperature of the deformed plate part and the melting temperature of the component, in order to achieve a secure and permanent connection between the plate part and the component through plug welding.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
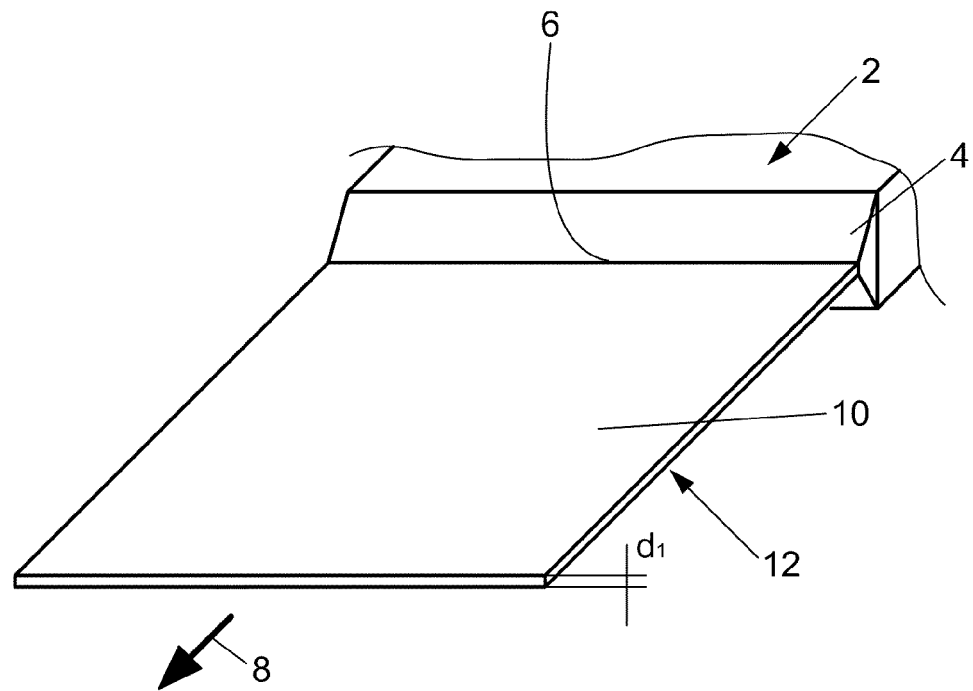
FIG. 1 shows a perspective illustration to represent a first method step of the method according to an embodiment of the invention.

FIG. 1 shows a first method step of an embodiment of the method according to the invention for producing a support structure. In the present example, a support structure for a vehicle seat having at least one seat shell for the seat part and/or the backrest of the vehicle seat is produced with the aid of the method, it being noted that the method is suitable for producing any type of support structure and is thus not restricted to the production of a support structure for a vehicle seat, although the advantages of the method are particularly clear here.

In the first method step, a metal semi-finished product is initially produced and reshaped into an essentially flat plate. An extrusion device 2 (only schematically indicated) is thus provided, which has a terminal die 4. A linear outlet opening 6 is provided in the die 4, through which the extruded material can exit in the outlet direction 8. The metal semi-finished product 10 is already shaped by the extrusion into a flat plate 12 by the linear implementation of the outlet opening 6. The flat plate 12 has a plate thickness d1, which is predefined by the size of the linearly implemented outlet opening 6. After this first method step, a flat plate 12 is thus available for further processing.

Figure 2:
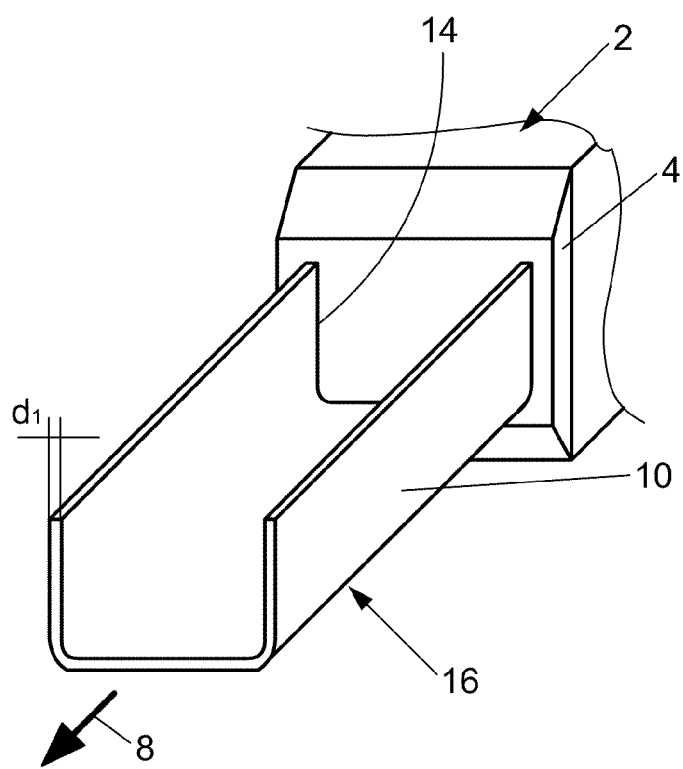
FIG. 2 shows a perspective illustration to represent the first method step of the method according to the invention in an alternative embodiment.
Figure 3:
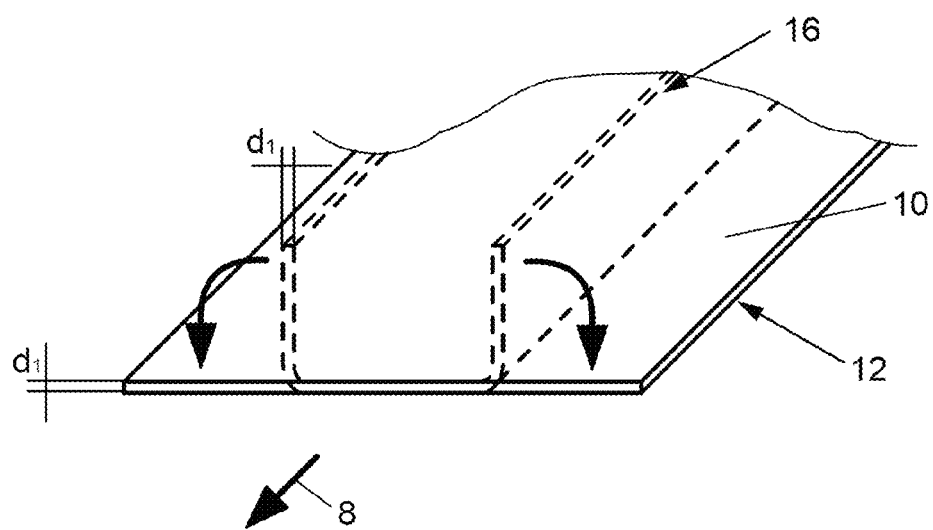
FIG. 3 shows a perspective illustration to represent a second method step in the alternative embodiment of the method according to the invention from FIG. 2.

In order to obtain a flat plate for further processing, alternatively, the procedure described in FIG. 2 and FIG. 3 can also be followed. In this case, the die 4 has a U-shaped outlet opening 14, so that the semi-finished product 10 is formed by a curved plate 16, which has a U-shaped cross-section. In this case, the curved plate 16 also has a plate thickness d1, which is in turn predefined by the size of the U-shaped outlet opening 14.

In order to subsequently reshape the curved plate 16 into a flat plate 12, it is deformed by a corresponding device, as indicated in FIG. 3, this preferably being performed by roll forming. The advantage of the embodiment according to FIG. 2 and FIG. 3 is that a more compact die 4 can be used, whereby the extrusion is made easier.

Independently of the selected procedure, a flat plate 12 is now available for further processing. The present flat plate 12 is to have a plate thickness d1, which is at most approximately 100%, preferably at most approximately 50%, greater than the target plate thickness ds of the plate part to be deformed, which is described in greater detail hereafter. In this case, the plate thickness d1 is reduced by rolling so that it corresponds to the target plate thickness ds. However, it is particularly preferable if the flat plate 12, which was either produced directly by extrusion (FIG. 1) or was produced by extrusion and subsequent reshaping (FIG. 2 and FIG. 3), already has a plate thickness d1 which corresponds to the target plate thickness ds, in order to avoid a subsequent rolling procedure, which would delay the production method and increase the energy expenditure.

Independently of the selected procedure, the semi-finished product 10 and/or the plate 12, 16 is produced from a material having a lower density than steel, the density of the selected material preferably corresponding to at most approximately 25% of the density of steel. The present exemplary embodiment is preferably a semi-finished product 10 made of aluminum or an aluminum alloy, particularly preferably a semi-finished product 10 made of magnesium or a magnesium alloy.

Figure 4:
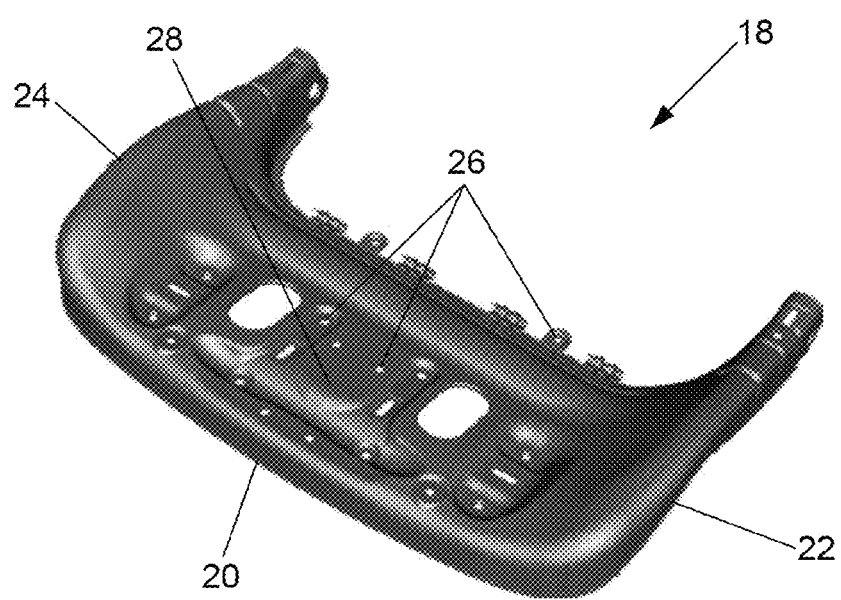
FIG. 4 shows a perspective illustration of a plate part, which was deformed to implement a seat shell.

Subsequently, a plate part is detached from the flat plate 12, which can be performed by stamping, for example, in order to subsequently deform this plate part to implement a seat shell 18, which is indicated for exemplary purposes in FIG. 4. The deformation of the plate part to implement the seat shell 18 is performed in this case by hot shaping in the context of a deep-drawing method. During the hot shaping, the heat from the preceding extrusion method is exploited, so that no further heating processes are necessary and energy costs may be saved. In addition, the time consumption for the manufacturing of the seat shell is reduced in this way. One also refers in this case to manufacturing from a heat.

The seat shell 18 thus produced (FIG. 4), which is implemented in the present example for the seat part of the vehicle seat, has a front edge 20 drawn downward and two side edges 22, 24 drawn downward. In addition, a plurality of fastening openings 26 is introduced into the seat shell 18. Furthermore, the seat shell 18 is to have a ramp 28 rising in the direction of the front edge 20, in order to prevent the so-called submarine effect.

Figure 5:
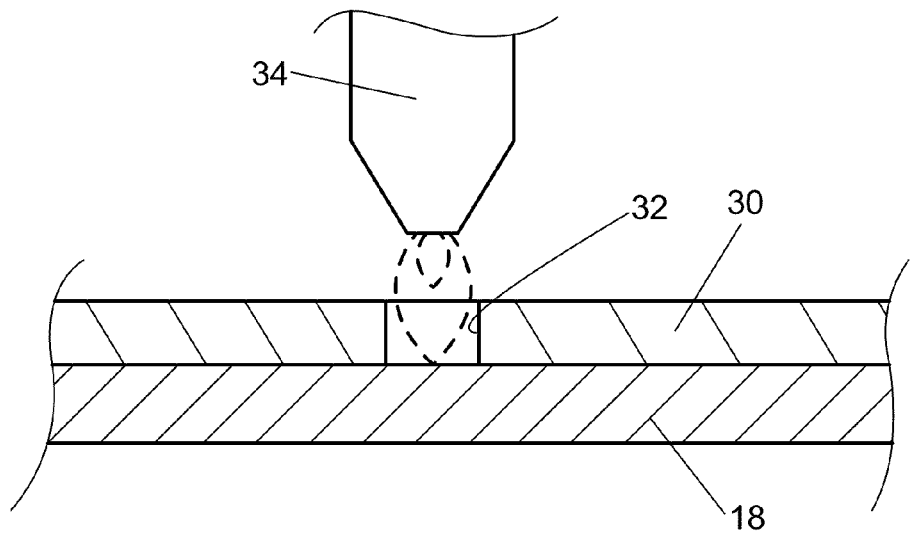
FIG. 5 shows a side view to represent the fastening of the seat shell on an adjacent component of the support structure during the fastening.
Figure 6:
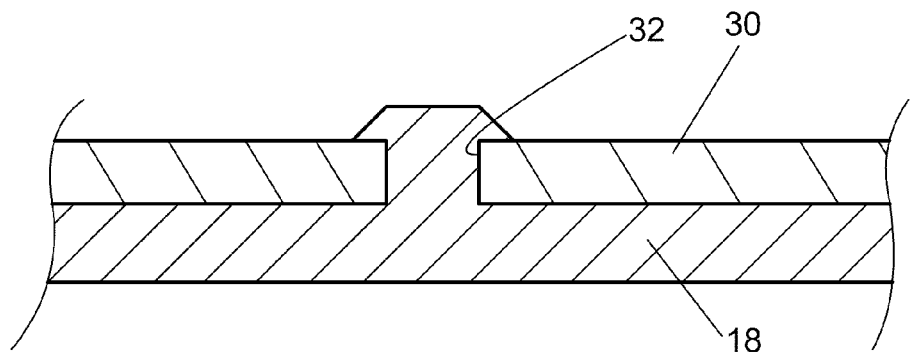
FIG. 6 shows the illustration of FIG. 5 after the fastening of the seat shell on the adjacent component.

In order to fasten the seat shell 18 on an adjacent component of the support structure, the procedure shown in FIG. 5 and FIG. 6 can be used. In the cited figures, the component adjacent to the seat shell 18 is provided with the reference numeral 30 and comprises steel, a hole 32 previously having been produced in the component 30. The seat shell 18 is subsequently situated on the component 30, in order to subsequently heat the seat shell 18 in the area of the hole 32 to a temperature which is between the melting temperature of the seat shell 18 and the melting temperature of the component 30. In this way, the liquefied material of the seat shell 18 rises upward in the hole 32 inside the component 30 and implements a rivet-like and secure connection between the component 30 and the seat shell 18 after the cooling. One also refers in this case to fastening by plug welding with a corresponding welding device 34.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method for producing a support structure for a seat bottom of a vehicle seat, comprising:
    extruding a metal semi-finished product through a die having a curved outlet opening of a predetermined thickness to produce a curved plate having a thickness of the predetermined thickness;
    roll forming the curved plate into an essentially flat plate;
    stamping a plate part out of the essentially flat plate; and
    deforming by deep drawing the plate part into a seat shell, the seat shell forming the support structure for the seat bottom of the vehicle seat.

2. The method according to claim 1, wherein the curved plate is produced with an open cross-section.

3. The method according to claim 2, wherein the open cross-section is a U-shaped cross-section.

4. The method according to claim 1, wherein the curved plate is produced with a closed cross-section that is opened in a subsequent step of the method in order to obtain the curved plate having an open cross-section.

5. The method according to claim 1, wherein the predetermined thickness is at most approximately 100% greater than a target plate thickness (ds) of a completed plate part.

6. The method according to claim 1, wherein the predetermined thickness is at most approximately 50% greater than a target plate thickness (ds) of a completed plate part.

7. The method according to claim 1, wherein the predetermined thickness corresponds to a target plate thickness (ds) of a completed plate part.

8. The method according to claim 1, wherein the roll forming reduces a thickness of the essentially flat plate to a target plate thickness for a completed plate part.

9. The method according to Claim 1, wherein the deep drawing is a hot forming.

10. The method according to claim 9, wherein the hot forming is conducted with residual heat from the extrusion.

11. The method according to claim 1, wherein the metal semi-finished product is produced from a material having a lower density than steel.

12. The method according to claim 1, wherein the metal semi-finished product is produced from a material having a lower density than steel.

13. The method according to claim 1, wherein the metal semi-finished product is produced from magnesium or a magnesium alloy.

14. The method according to claim 1, wherein the metal semi-finished product is produced from aluminum alloy.

15. The method according to claim 1, further comprising the step of fastening the seat shell on an component adjacent to the support structure.

16. The method according to claim 15, further comprising the steps of:
   producing at least one hole within the adjacent component;
   situating the seat shell on the adjacent component;
   heating the seat shell in an area of the at least one hole to a temperature that is between a first melting temperature of the seat shell and a second melting temperature of the adjacent component.

\* \* \* \* \*